United States Patent Office 3,410,824 Patented Nov. 12, 1968

3,410,824

LIGHT SENSITIVE RESIN FROM A DIHYDROXY CHALCONE AND AN EPOXY PREPOLYMER

Ralph B. Atkinson, Coast Rte., Monterey, Calif. 93940

No Drawing. Filed Mar. 19, 1965, Ser. No. 441,377
8 Claims. (Cl. 260—47)

ABSTRACT OF THE DISCLOSURE

Resins formed from the reaction of epichlorhydrin or an epoxy prepolymer and a dihydroxy chalcone and useful as light sensitive resins.

This invention relates to light sensitive resins, and more particularly to epoxy-type resins made from epichlorhydrin and hydroxy chalcones and to a method for producing these resins.

Among the objects of the present invention are the following: the provision of a new group of light sensitive resins having useful and unexpected properties in their insoluble form, such as adhesion, toughness, resistance to aqueous acids, alkalies, and oxidizing agents; the provision of a new group of light sensitive resins which are not susceptible in their soluble form in organic solvents to side reactions rendering them prematurely insoluble; and the provision of a process whereby this new group of light sensitive resins may be batch-produced repetitively to substantially constant standards. Other objects and advantages of the invention will appear during the course of the specification to follow of the invention.

The synthesis of the subject epoxy-type resins parallels that of epoxy resins from epichlorhydrin and other hydroxy compounds, e.g., Bisphenol A, or 4,4-iso-propylidenediphenol, which is the basis of most commercial epoxy resins. The subject epoxy-type resins differ most notably from the epoxy resins in that they contain the grouping —CH=CH—CO— bonded to aromatic nuclei, the double bond of this grouping being subject to disruption by ultraviolet light, such disruption resulting in the cross-linking of resin molecules with resulting alteration of the solubility and other properties of the resin.

In accordance with the subject invention, use is made of this light sensitivity by way of the preparation of coatings of these resins which are readily soluble in the absence of ultraviolet light, but insoluble after exposure to such light, so that a solvent "developer" may be employed to remove the unexposed portions of the resin coating, leaving an image on a support.

The herein epichlorhydrin-chalcone resins, when insolubilized by exposure to ultraviolet radiation, have great resistance to aqueous acids, alkalies, and oxidizing agents, thus rendering them particularly beneficial and desirable for use as resists in the graphic arts industries.

It is not necessary to prepare the subject resins from raw materials inasmuch as certain commercial epoxy resins can be reacted with the hydroxy chalcones to achieve the desired result. For example, Ciba Corporation's epoxy resin identified by the trademark "Araldite 6010," when combined with dihydroxy distyril ketone, yields a soluble light sensitive resin which is insoluble and resistant after exposure.

One of the most satisfactory light sensitive products according to the invention is comprised of an epichlorhydrin-chalcone synthesized resin and a further resin formed from a commercial epoxy resin and the same chalcone, all combined in an organic solvent or organic solvent mixture. The thus far preferred chalcone is 4.4'-dihydroxy distyril ketone. The most useful commercial epoxy resin for my purposes has thus far proven to be Dow's "DEN 438," designating a resin of the epoxy-novolak type, i.e., one that combines both epoxy and phenolic groups for increased chemical resistance and toughness.

The resins of the subject invention lend themselves readily to compounding with sensitizers, plasticizers, fillers, wetting agents, coloring agents, and the like. Such may be added to the resin solution to achieve particular qualities.

The following are presented as being exemplary of the subject resins and of the processes of making and using them:

Example 1

| | | |
|---|---|---|
| 3,4'-dihydroxy chalcone | grams | 12 |
| Bisphenol A | do | 12 |
| NaOH | do | 12 |
| Epichlorhydrin | do | 30 |
| Water | ml | 100 |

The above mixture was heated under reflux at 90° C. for one hour. The resulting solid product, after being washed with water and dried, is termed herein as Resin A.

Resin A was dissolved in a mixture of 2-ethoxy ethanol and cyclohexanone to make a 5% solution. A coating of the 5% solution was coated on a metal support (e.g. copper or aluminum). After drying, the coating was exposed through a negative to a mercury-vapor lamp (125 watts) for five minutes. It was then developed at room temperature for one minute in a mixture of 2-ethoxy ethanol and 4-methylpentanone to give a permanent resistant image. After development the image coating was rinsed in hot water and then dried.

Example 2

| | | |
|---|---|---|
| 4,4'-dihydroxy distyril ketone | grams | 24 |
| NaOH | do | 12 |
| Epichlorhydrin | do | 30 |
| Water | ml | 100 |

The above mixture was worked up into a resin and then tested as a resistant image coating in accordance with the procedural details of Example 1. As a resistant image coating this resin is workable but not as desirable as that of Example 1.

Example 3

Resin A (Example 1) may be combined at the coating solution preparation stage with an already prepared epoxy resin, e.g.:

| | | |
|---|---|---|
| Resin A | grams | 5 |
| "Epon 864" (Shell) | do | 5 |
| Cyclohexanone | ml | 20 |
| 2-ethoxy ethanol | ml | 80 |

The addition of the epoxy resin increases the viscosity of the coating solution, as compared to that of the 5% coating solution of Resin A in Example 1, and provides a resulting permanent image which is more resistant to aqueous solutions than the Example 1 coating solution.

Example 4

A commercial epoxy resin may be combined with a chalcone to achieve similar results from the standpoints of light sensitivity, development and the formation of a resistant image coating, i.e.:

| | | |
|---|---|---|
| "D.E.R. 332" (Dow) | grams | 12 |
| 4,4'-dihydroxy distyril ketone | do | 12 |
| Chlorobenzene | ml | 40 |
| 2-ethoxy ethanol | ml | 40 |

The above mixture was heated to boiling under reflux for one hour. The resulting solution was cooled and then poured into methanol. The resulting solid was thereafter dissolved in a 50-50 mixture of cyclohexanone and 2-ethoxy ethanol. This solution was then coat-applied in the manner and with the same general results as set forth in Example 1.

Example 5

| | | |
|---|---|---|
| 4,4'-dihydroxy distyril ketone | grams | 6 |
| Bisphenol A | do | 18 |
| NaOH | do | 12 |
| Epichlorhydrin | ml | 30 |
| Water | ml | 100 |

The above mixture was heated under reflux at 90° C. for one hour. The resulting solid product, after being washed with water and dried, is termed herein as Resin B. Resin B was then combined as follows:

| | | |
|---|---|---|
| Resin B | grams | 10 |
| "DEN 438" (Dow) | do | 10 |
| 4,4'-dihydroxy distyril ketone | do | 20 |
| 2-ethoxy ethanol | ml | 20 |
| O-dichlorobenzene | ml | 55 |

This mixture was heated to boiling under reflux for one hour, cooled and poured into methanol. The resulting resin was then dissolved in 2-ethoxy ethanol to make a 5% solution, the latter being coated onto a metal support, dried, negative-exposed, developed, rinsed and dried in the manner described in Example 1. As a resistant image coating, the resin of this example proved to have very great chemical resistance, probably surpassing the properties of most other light sensitive resins of the reproduction art in this respect.

A critical factor from the practical standpoint of producing advantageously usable resins of the invention is to cook each such resin for just the right length of time. An excessive cook, i.e., for too long a time at any given temperature, results in the gelling of the mix. This may occur in two hours at 132° C. or in ten minutes at 180° C. In accordance with the invention, the cooking temperature is regulated carefully by the suitable mixture of solvents in which the reactants are cooked, chiefly chlorobenzene (B.P. 132° C.), ortho-dichlorobenzene (B.P. 180–183° C.) and 2-ethoxy ethanol (B.P. 135.1° C.).

In accordance with the invention it has been found that alkali acts as a catalyst in the sense that it increases the cooking, or reaction, rate. Also, the use of an exact amount of alkali catalyst facilitates the obtaining of alike batches of resin product. In the following example the use of an alkali catalyst in the form of a 0.3% solution of potassium hydroxide in methanol is reflected:

Example 6

| | | |
|---|---|---|
| "D.E.N. 438" (Dow) | grams | 12 |
| 4,4'-dihydroxy distyril ketone | do | 12 |
| 0.3% soln. KOH | ml | 3 |
| 2-ethoxy ethanol | ml | 6 |
| O-dichlorobenzene | ml | 24 |

The above mixture was cooked for thirty minutes at 155° C. The resulting resin provided a high grade resistant image coating.

The range of useful concentrations of alkali or alkaline solutions is quite broad. The potassium hydroxide, sodium hydroxide, or other alkali may be added directly to the batch rather than in solution form. In connection with the foregoing example, the alcoholic solution of alkali was employed merely as a convenient way of adding a relatively small quantity of alkali to the batch.

Useful epoxy prepolymers from the standpoint of the subject invention may have a molecular weight of about 300 to about 2,000. The preferred molecular weight is from about 340 to about 750.

An epoxide equivalent is the weight of a molecule which contains exactly one epoxide group. With reference to the subject invention, epoxy prepolymers may be used which have an epoxide equivalent weight of from about 175 to about 1,000, with the preferred range being from about 180 to about 360. When prepolymers are used which have an epoxide equivalent weight of from about 175 to about 1,000, the light sensitive polymers constituting the finished products of the invention have a molecular weight of from about 500 to about 4,000.

Among the other chalcones which may be employed in the synthesis of the subject resins are the following: 2,4'-dihydroxy chalcone; 2',4-dihydroxy chalcone; 2',4'-dihydroxy chalcone; 2',3-dihydroxy chalcone; 2,5'-dihydroxy chalcone; and 2,2'-dihydroxy chalcone.

What is claimed is:

1. A light sensitive resin comprising the reaction product of a dihydroxy chalcone and an epoxy prepolymer having a molecular weight of about 300 to about 2,000 and an epoxide equivalent weight of from about 175 to about 1,000, said resin having a molecular weight of from about 500 to about 4,000, said chalcone being selected from a group consisting of 4,4'-dihydroxy distyril ketone, 3,4'-dihydroxy chalcone, 2,4'-dihydroxy chalcone, 2',4-dihydroxy chalcone, 2',4'-dihydroxy chalcone, 2',3-dihydroxy chalcone, 2,5'-dihydroxy chalcone, 2,2'-dihydroxy chalcone, said epoxy prepolymer containing a plurality of 1,2-epoxide groups, said chalcone and prepolymer being reacted by heating to an elevated temperature for a time insufficient to produce a gel.

2. A light sensitive resin comprising the alkali hydroxide-reacted product of epichlorhydrin and a dihydroxy chalcone, said resin having a molecular weight of from about 500 to about 4,000, said chalcone being selected from a group consisting of 4,4'-dihydroxy distyril ketone, 3,4'-dihydroxy chalcone, 2,4'-dihydroxy chalcone, 2',4-dihydroxy chalcone, 2',4'-dihydroxy chalcone, 2',3-dihydroxy chalcone, 2,5'-dihydroxy chlacone, 2,2'-dihydroxy chalcone, said chalcone and epichlorhydrin being reacted by heating to an elevated temperature for a time insufficient to produce a gel.

3. In the process of reacting epichlorhydrin with a bivalent phenol in the presence of alkali hydroxide, the improvement comprising the partial to full substitution of a dihydroxy chalcone for said bivalent phenol to thereby obtain a light sensitive resin having a molecular weight of from about 500 to about 4,000, said chalcone being selected from a group consisting of 4,4'-dihydroxy distyril ketone, 3,4'-dihydroxy chalcone, 2,4'-dihydroxy chalcone, 2',4-dihydroxy chalcone, 2',4'-dihydroxy chalcone, 2',3-dihydroxy chalcone, 2,5'-dihydroxy chalcone, 2,2'-dihydroxy chalcone, said material being reacted by heating to an elevated temperature for a time insufficient to produce a gel.

4. A method of producing a light sensitive resin comprising forming an admixture of reactant portions of a dihydroxy chalcone and an epoxy prepolymer having a molecular weight of about 300 to about 2,000 and an epoxide equivalent weight of from about 175 to about 1,000 in at least one organic solvent selected from the class consisting of chlorobenzene, ortho-dichlorobenzene and 2-ethoxy ethanol in the presence of a catalytic amount of an alkali hydroxide, and refluxing said mixture for a period of time which is insufficient to produce gelling, said chalcone being selected from a group consisting of 4,4'-dihydroxy distyril ketone, 3,4'-dihydroxy chalcone, 2,4'-dihydroxy chalcone, 2',4-dihydroxy chalcone, 2',4'-dihydroxy chalcone, 2',3-dihydroxy chalcone, 2,5'-dihydroxy chalcone, 2,2'-dihydroxy chalcone, said epoxy prepolymer containing a plurality of 1,2-epoxide groups.

5. A light sensitive resin comprising the reaction product of 4,4'-dihydroxy distyril ketone and an epoxy prepolymer having a molecular weight of about 300 to about 2,000 and an epoxide equivalent weight of from about 175 to about 1,000, said resin having a molecular weight within the range of from about 500 to about 4,000, said epoxy prepolymer containing a plurality of 1,2-epoxide groups, said ketone and prepolymer being reacted by heating to an elevated temperature for a time insufficient to produce a gel.

6. A light sensitive resin comprising the alkali hydroxide-reacted product of epichlorhydrin and 4,4′-dihydroxy distyril ketone, said resin having a molecular weight within the range of from about 500 to about 4,000, said ketone and epichlorhydrin being reacted by heating to an elevated temperature for a time insufficient to produce a gel.

7. In the process of reacting epichlorhydrin with a bivalent phenol in the presence of alkali hydroxide, the improvement comprising the partial to full substitution of 4,4′-dihydroxy distyril ketone for said bivalent phenol to thereby obtain a light sensitive resin having a molecular weight within the range of from about 500 to about 4,000, said reaction materials being reacted by heating to an elevated temperature for a time insufficient to produce a gel.

8. A method of producing a light sensitive resin comprising forming an admixture of reactant portions of 4,4′-dihydroxy distyril ketone and an epoxy prepolymer having a molecular weight of about 300 to about 2,000 and an epoxide equivalent weight of from about 175 to about 1,000 in at least one organic solvent selected from the class consisting of chlorobenzene, ortho-dichlorobenzene and 2-ethoxy ethanol in the presence of a catalytic amount of an alkali hydroxide, and refluxing said admixture for a period of time which is insufficient to produce gelling, said epoxy prepolymer containing a plurality of 1,2-epoxide groups.

References Cited

UNITED STATES PATENTS 2,528,932 11/1950 Wiles et al.

WILLIAM H. SHORT, *Primary Examiner.*

T. D. KERWIN, *Assistant Examiner.*